(12) United States Patent
Nadler et al.

(10) Patent No.: US 10,496,841 B2
(45) Date of Patent: Dec. 3, 2019

(54) DYNAMIC AND EFFICIENT PROTECTED FILE LAYOUT

(71) Applicant: Intel Corporation, Santa Clara, CA (US)

(72) Inventors: Ishai Nadler, Haifa (IL); Ilya Berdichevsky, Netanya (IL)

(73) Assignee: Intel Corporation, Santa Clara, CA (US)

(*) Notice: Subject to any disclaimer, the term of this patent is extended or adjusted under 35 U.S.C. 154(b) by 365 days.

(21) Appl. No.: 15/417,508

(22) Filed: Jan. 27, 2017

(65) Prior Publication Data
US 2018/0219841 A1 Aug. 2, 2018

(51) Int. Cl.
| | |
|---|---|
| H04L 29/06 | (2006.01) |
| G06F 21/62 | (2013.01) |
| G06F 21/64 | (2013.01) |
| H04L 9/06 | (2006.01) |
| H04L 9/08 | (2006.01) |
| H04L 9/32 | (2006.01) |

(52) U.S. Cl.
CPC .......... *G06F 21/6218* (2013.01); *G06F 21/64* (2013.01); *H04L 9/0637* (2013.01); *H04L 9/0836* (2013.01); *H04L 9/0891* (2013.01); *H04L 9/3236* (2013.01); *H04L 63/0428* (2013.01); *H04L 63/123* (2013.01); *H04L 2209/38* (2013.01)

(58) Field of Classification Search
CPC ....... H04L 9/06; G06F 21/64; G06F 21/6209; G06F 2221/2107
See application file for complete search history.

(56) References Cited

U.S. PATENT DOCUMENTS

| | | | |
|---|---|---|---|
| 8,832,466 B1* | 9/2014 | McGregor, Jr. ....... | H04L 9/0836 713/193 |
| 2005/0071640 A1* | 3/2005 | Sprunk ................. | H04L 9/0894 713/176 |
| 2017/0286709 A1* | 10/2017 | Araki .................. | G06F 21/6218 |

OTHER PUBLICATIONS

Pletka, Roman and Cachin, Christian. Crytographic Security for a High-Performance Distributed File System. 24th IEEE Conference on Mass Sotrage Systems and Technologies. 2007. 0-7695-3025-7/07. 4 Pages. (Year: 2007).*

(Continued)

*Primary Examiner* — Jason K Gee
(74) *Attorney, Agent, or Firm* — Trop, Pruner & Hu, P.C.

(57) ABSTRACT

A file layout and encryption scheme to protect a data file are introduced. A system, computer-readable medium, and method are provided for selecting an encrypted data node of a data file for writing data, generating a node encryption key for the selected encrypted node, encrypting the selected encrypted node with the node encryption key, saving the node encryption key and a node integrity check value for the node encryption key in a parent encrypted cryptographic node, selecting an ancestor encrypted cryptographic node as the selected encrypted node, and repeating the generating, encrypting, saving, and selecting the ancestor encrypted cryptographic node until the selected ancestor encrypted cryptographic node is a root encrypted cryptographic node for the data file. Encrypting a data node with the node encryption key further saves the data to be written to the encrypted data node.

21 Claims, 9 Drawing Sheets

(56) References Cited

OTHER PUBLICATIONS

Wikipedia, "Database Storage Structures", https://en.wikipedia.org/wiki/Database_storage_structures#Hash_buckets, accessed Aug. 12, 2016, 3 pages.

The Swirl Project, "Bringing Peer-to-Peer Streaming to the World", http://www.swirl-project.org/content/merkle/,accessed Aug. 12, 2016, 5 pages.

Halcrow, "eCryptfs: An Enterprise-class Cryptographic Filesystem for Linux", https://www.ibm.com/support/knowledgecenter/linuxonibm/liaax/halcrow-05.pdf, 2005 Linux Symposium, 18 pages, International Business Machines, Inc.

\* cited by examiner

DYNAMIC AND EFFICIENT PROTECTED FILE LAYOUT

TECHNICAL FIELD

Embodiments relate to security of data files, and in particular, to ensuring confidentiality and integrity of data stored in an untrusted file system.

BACKGROUND

Malicious software has become a pervasive problem for Internet users as many networked resources include vulnerabilities that are subject to attack. For instance, over the past few years, more and more vulnerabilities are being discovered in software that is loaded on endpoint devices present on a network. These vulnerabilities may be exploited by allowing a third-party, e.g., through computer software, to gain access to one or more areas within the network not typically accessible. For example, a third-party may exploit a software vulnerability to gain unauthorized access to sensitive information such as email accounts and/or data files. These software vulnerabilities may exist within application programs, operating systems, file systems, and the like.

One type of malware may exhibit behaviors such as infecting, encrypting, deleting and/or stealing files (hereinafter generally referred to as "file modifying malware"). Insecure file operations may give an attacker the ability to read confidential information, perform a denial of service attack, take control of an application, or even take control of the entire system.

In some instances, file modifying malware may enter a computer system, for example, when a user of an endpoint device activates a uniform resource locator (URL) in an Internet-browser application or downloads a file from a network or opens an e-mail attachment. Subsequently, the file modifying malware may modify various files within the computer, which may include encrypting one or more files thereby restricting access to the one or more files. The file modifying malware may then request a payment for a key to decrypt one or more files.

In some cases, the file modifying malware may target particular data storage locations, such as files and/or folders containing sensitive personal, financial, or corporate information. Additional security measures beyond traditional access control are needed to protect sensitive data files from malicious attackers.

DETAILED DESCRIPTION

Figure 1:
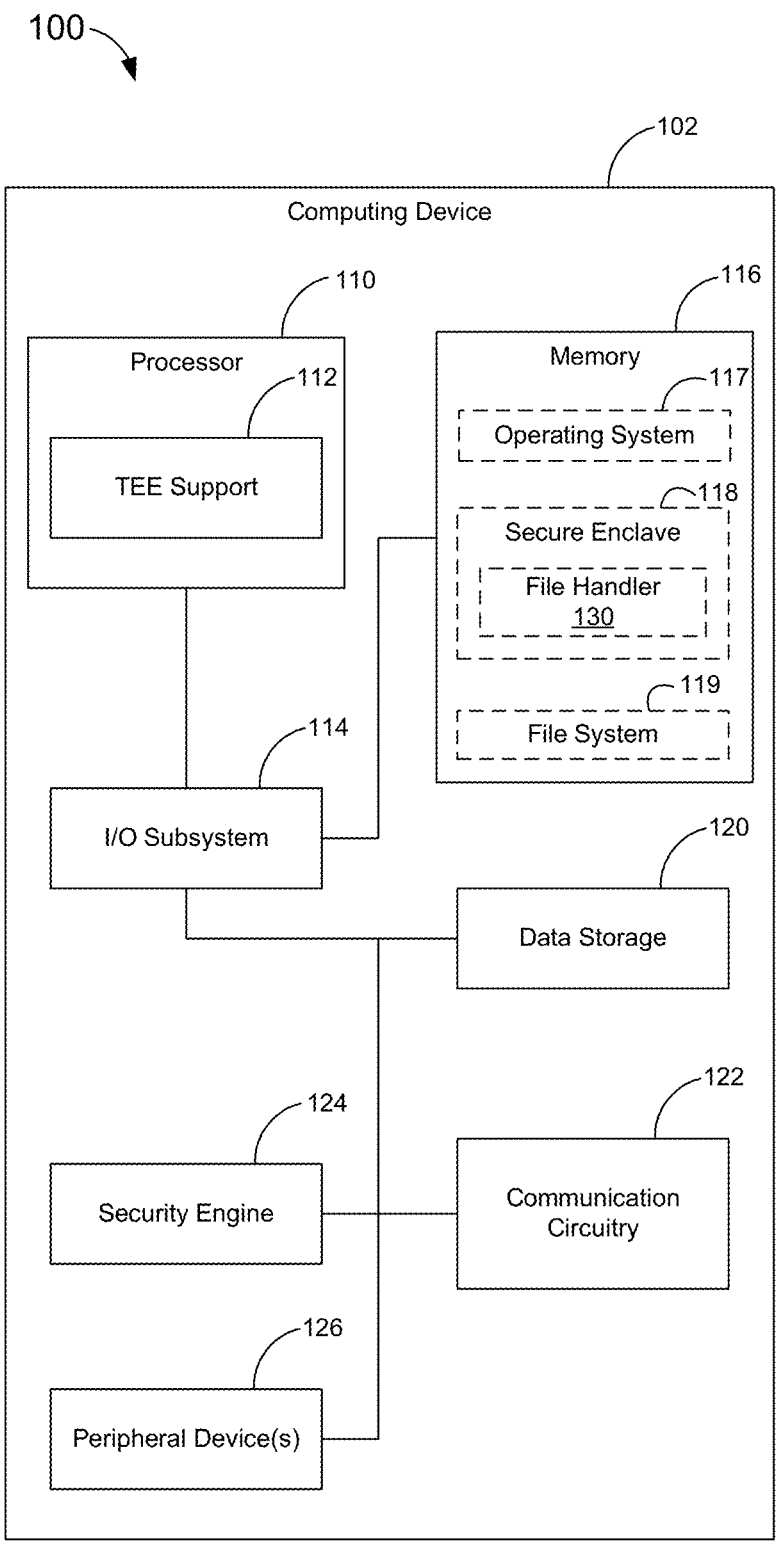
FIG. 1 is a block diagram of a computing device in which embodiments of the invention may be used.

Techniques are disclosed herein for enabling an application running in a trusted runtime environment to save data files in an untrusted environment, thereby limiting the effect of malware that attacks software vulnerabilities. The data files are structured in accordance with a file layout that protects the data confidentiality and integrity while still keeping the file usable, similar to other regular files. The solution described herein supports all file sizes, with minimum performance and storage overhead. Files saved in accordance with the file layout described herein can be distributed to many machines, while protecting each user's changes to the user's respective copy of the file from visibility by other users of the file.

One existing technique for protecting a data file encrypts the plaintext into a single encrypted block, and saves the encrypted block into the file. When input/output is needed, the entire file is loaded into memory, the contents are decrypted and checked for integrity, and changes to the data file are encrypted and saved back into the file. This solution is limited by the file size, as the entire file is saved in memory, and for every bit that changes, the entire file must be re-encrypted. The size of the file for which this solution can be used is limited to the amount of data that can be read into memory.

For file integrity alone, one approach is to hash the entire file, or build a hash tree over the file. Building a hash tree over the file is advantageous in that a user doesn't need to read the entire file to verify the integrity of a small portion of the file.

One technique for maintaining confidentiality of data stored in a file is eCryptfs: (https://www.ibm.com/support/knowledgecenter/linuxonibm/liaax/halcrow-05.pdf). eCryptfs stores the cryptographic context for each file as header information contained directly in the underlying file. However, this solution trusts the file system and the operating system, and therefore doesn't embed the integrity values as part of the file layout. Also, the eCryptfs solution uses one permanent key per file. National Institute of Standards and Technology (NIST) specifications (such as the SP-800-38D specification entitled, "Recommendation for Block Cipher Modes of Operation: Galois/Counter Mode (GCM) and GMAC," (November 2007), which is available at http://dx.doi.org/10.6028/NIST.SP.800-38D (redirects to http://nvlpubs.nist.gov/nistpubs/Legacy/SP/nistspecialpublication800-38D.pdf), limits the number of encryptions allowed of a given file with the same key. In an environment where there is only one copy of each file, the number of encryptions per key can be controlled. If distribution of a file is allowed, the number of encryptions cannot be limited, as there is no central 'manager' to enforce the limit. In addition, if one key exists per file and the file is duplicated, each user of the file can read the modifications made by other users (because all users of the file have access to the key).

Referring now to FIG. 1, in an illustrative embodiment, an environment 100 for secure processing of a data file includes a computing device 102. Computing device 102 may be embodied as any type of computation or computing device capable of performing the functions described herein, including, without limitation, a computer, a mobile computing device (e.g., smartphone, tablet, laptop, notebook, wearable, etc.), a server (e.g., stand-alone, rack-mounted, blade, etc.), a network appliance (e.g., physical or virtual), a web appliance, a distributed computing system, a processor-based system, and/or a multiprocessor system. In one embodiment, computing device 102 is a portable computing device (e.g., smartphone, tablet, laptop, notebook, wearable, etc.) that includes mobile hardware (e.g., processor, memory, storage, wireless communication circuitry, etc.) and software (e.g., an operating system) to support a mobile architecture and portability. The illustrative computing device 102 includes a processor 110, an input/output (I/O) subsystem 114, a memory 116, a data storage device 120, communication circuitry 122, a security engine 124, and one or more peripheral devices 126.

Of course, computing device 102 may include other or additional components, such as those commonly found in a computing device, in other embodiments. Additionally, in some embodiments, one or more of the illustrative components may be incorporated in, or otherwise form a portion of, another component. For example, the memory 116, or portions thereof, may be incorporated in the processor 110 in some embodiments. Further, in some embodiments, one or more of the illustrative components may be omitted from computing device 102.

The processor 110 may be embodied as any type of processor capable of performing the functions described herein. The processor 110 may be embodied as a single or multi-core processor(s), digital signal processor, microcontroller, or other processor or processing/controlling circuit. The illustrative processor 110 includes trusted execution environment (TEE) support 112. The TEE support 112 allows the processor 110 to establish a software execution environment in which executing code may be measured, verified, or otherwise determined to be authentic.

Additionally, code and data included in the software TEE may be encrypted or otherwise protected from being accessed by code executing outside of the software TEE. In some embodiments, the TEE support 112 may be embodied as Intel® Software Guard Extensions (SGX) technology. Intel® SGX technology may be embodied as a set of processor instruction extensions that allow the processor 110 to establish one or more secure enclaves 118 in the memory 116, which may be embodied as regions of memory including software that are isolated from other software executed by the processor 110. File handler 130 is an example of software within secure enclave 118, where file handler 130 implements the data file processing operations described herein.

The memory 116 may be embodied as any type of volatile or non-volatile memory or data storage capable of performing the functions described herein. In operation, the memory 116 may store various data and software used during operation of the main computing device 102, such as operating systems (e.g., operating system 117), file systems (e.g., file system 119), applications, programs, libraries, and drivers. In some embodiments, the memory 116 may include one or more secure enclaves 118 (i.e., software isolation trusted execution environments (TEEs)). Each secure enclave 118 may be embodied as a protected region of the memory 116. Each secure enclave 118 may include code, such as file handler 130, and data that is measured, validated, or otherwise authenticated.

Similar to the TEE, the contents of the secure enclave 118 may be protected from access by software executing outside of the same secure enclave 118 (even from other secure enclaves executing on the same device 102). The contents of each secure enclave 118 may be protected from access and/or tampering using any combination of hardware protection and/or cryptographic protection. For example, each secure enclave 118 may be embodied as a secure enclave created and otherwise managed using Intel® Software Guard Extensions (SGX) technology. In some embodiments, a part of or the entirety of the secure enclave 118 may be stored in a specialized memory structure such as an enclave page cache (EPC).

The memory 116 is communicatively coupled to the processor 110 via the I/O subsystem 114, which may be embodied as circuitry and/or components to facilitate input/output operations with the processor 110, the memory 116, and other components of the main computing device 102. For example, the I/O subsystem 114 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 114 may form a portion of a system-on-a-chip (SoC) and be incorporated, along with the processor 110, the memory 116, and other components of the main computing device 102, on a single integrated circuit chip.

The data storage device 120 may be embodied as any type of device or devices configured for short-term or long-term storage of data such as, for example, memory devices and circuits, memory cards, hard disk drives, solid-state drives, or other data storage devices. The data storage device 120 and/or the memory 116 (e.g., the computer-readable storage media) may store various data as described herein, including operating systems such as operating system 117, file systems such as file system 119, applications, programs, libraries, drivers, instructions, etc., capable of being executed by a processor (e.g., the processor 110) of computing device 102.

The communication circuitry 122 may be embodied as any communication circuit, device, or collection thereof, capable of enabling communications between computing device 102 and other computing devices (e.g., over the Internet). The communication circuitry 122 may be configured to use any one or more short-range wireless communication technologies and associated protocols (e.g., Bluetooth®, Bluetooth® Low Energy (BLE), near-field communication (NFC), and/or any other short-ranged wireless communication protocol) to effect such communication. The communication circuitry 122 may be additionally configured to use any one or more other communication technologies (e.g., wireless or wired communication technologies) and associated protocols (e.g., Ethernet, Wi-Fi®, WiMAX, LTE, 5G, etc.) to effect communication with other computing devices, such as over a network.

The security engine 124 may be embodied as any hardware component(s) or circuitry capable of establishing a trusted execution environment (TEE) on computing device 102. In particular, the security engine 124 may support executing code and/or accessing data that is independent and secure from other code executed by the main computing device 102. The security engine 124 may be embodied as a Trusted Platform Module (TPM), a manageability engine (ME), an out-of-band processor, or other security engine device or collection of devices. In some embodiments, the security engine 124 may be embodied as an Intel® Converged Security and Manageability Engine (CSME) incorporated in a system-on-a-chip (SoC) of computing device 102. Further, in some embodiments, the security engine 124 may also be capable of communicating using the communication circuitry 122 and/or a dedicated communication circuit independently of the state of computing device 102 (e.g., independently of the state of the processor 110), also known as "out-of-band" communication.

The peripheral devices 126 may include any number of input/output devices, interface devices, and/or other peripheral devices. For example, in some embodiments, the peripheral devices 126 may include a display, a touch screen, biometric sensors, graphics circuitry, a keyboard, a mouse, a microphone, a speaker, and/or other input/output devices, interface devices, and/or peripheral devices. The particular devices included in the peripheral devices 126 may depend on, for example, the type and/or intended use of the main computing device 102. The peripheral devices 126 may additionally or alternatively include one or more ports, such as a USB port, for example, for connecting external peripheral devices to computing device 102.

Figure 2:
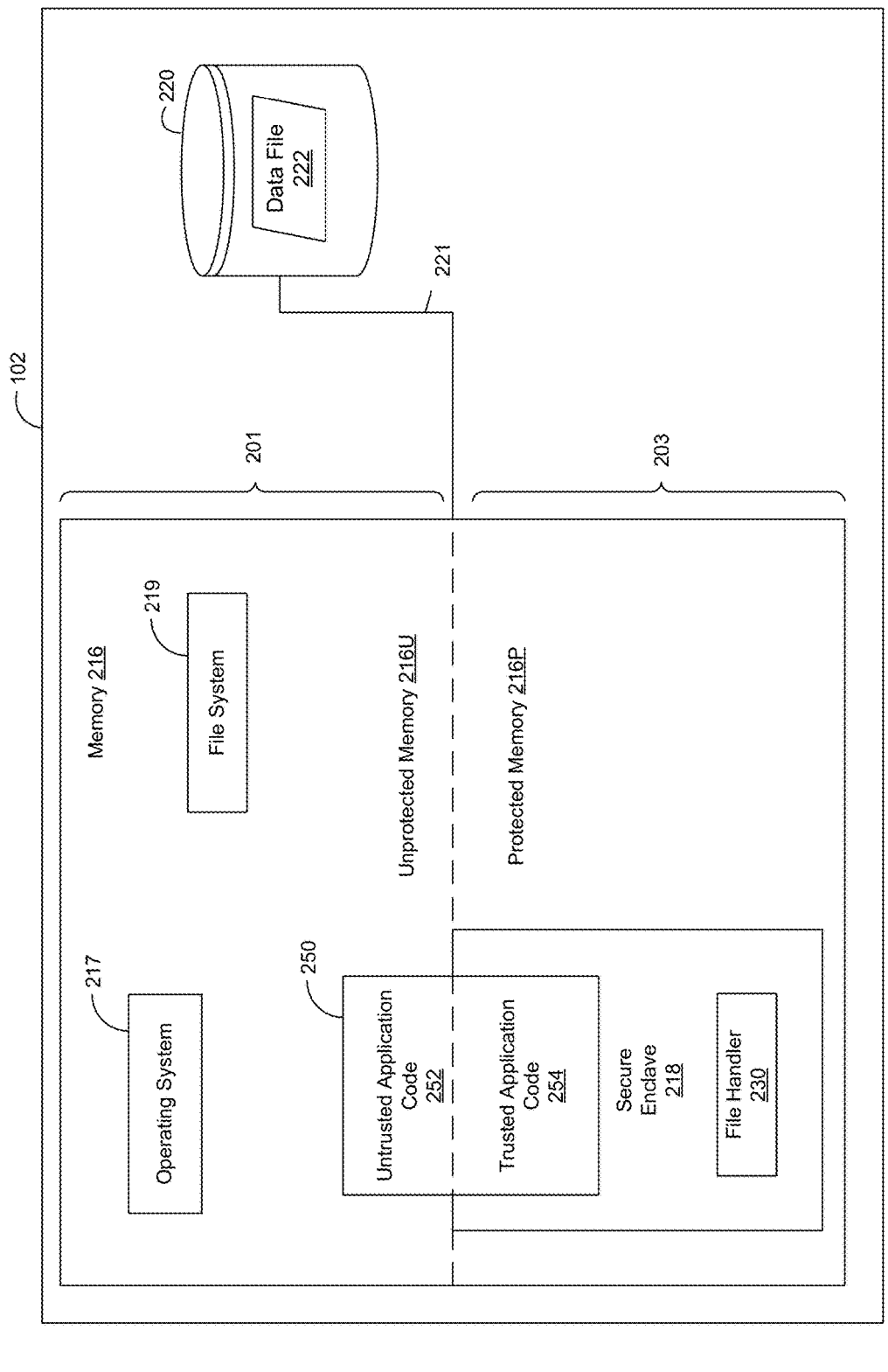
FIG. 2 is a block diagram of an operating environment of the computing device of FIG. 1.

Referring now to FIG. 2, in an illustrative embodiment, computing device 102 establishes an environment 200 during operation. The illustrative environment 200 includes memory 216 and data storage 220, which includes data file 222. Memory 216 includes an untrusted environment 201, in which operating system 217 and file system 219 execute, and trusted execution environment 203, which includes a secure enclave 218. Secure enclave 218 includes file handler 230, which may implement the data file processing operations described herein.

Memory 216 is shown as being made up of unprotected memory 216U (above the dotted line), which corresponds to untrusted environment 201, and protected memory 216P (below the dotted line), which corresponds to trusted execution environment 203. An application 250 is shown with two portions, untrusted application code 252, which executes in untrusted environment 201/unprotected memory 216U, and trusted application code 254, which executes within secure enclave 218 in trusted execution environment 203/protected memory 216P.

Operations on data file 222 are performed via secure enclave 218. Secure enclave 218 holds the trusted code, such as trusted application code 254 and file handler 230, as well as data and the software stack. Trusted application code 254 running within secure enclave 218 may read encrypted data from data file 222. File handler 230 within secure enclave 218 transfers the encrypted data to operating system 217 of untrusted environment 201. Operating system 217 may read or write the encrypted data from or to data file 222. Operating system 217 may read encrypted data from data file 222 and transfer the encrypted data to secure enclave 218.

Embodiments include a file layout that enables trusted code, such as trusted application code 254 or file handler 230, running within secure enclave 218 to save a data file 222 via untrusted file system 219 and nevertheless protect the confidentiality and integrity of the data in the file. Similarly, untrusted application code 252 running in an untrusted environment 201 can read data from data file 222 and pass it to secure enclave 218 for secure updating of the data. The solution does not trust the underlying operating system or the native file system. The file layout is based upon a modified hash tree layout.

Figure 3:
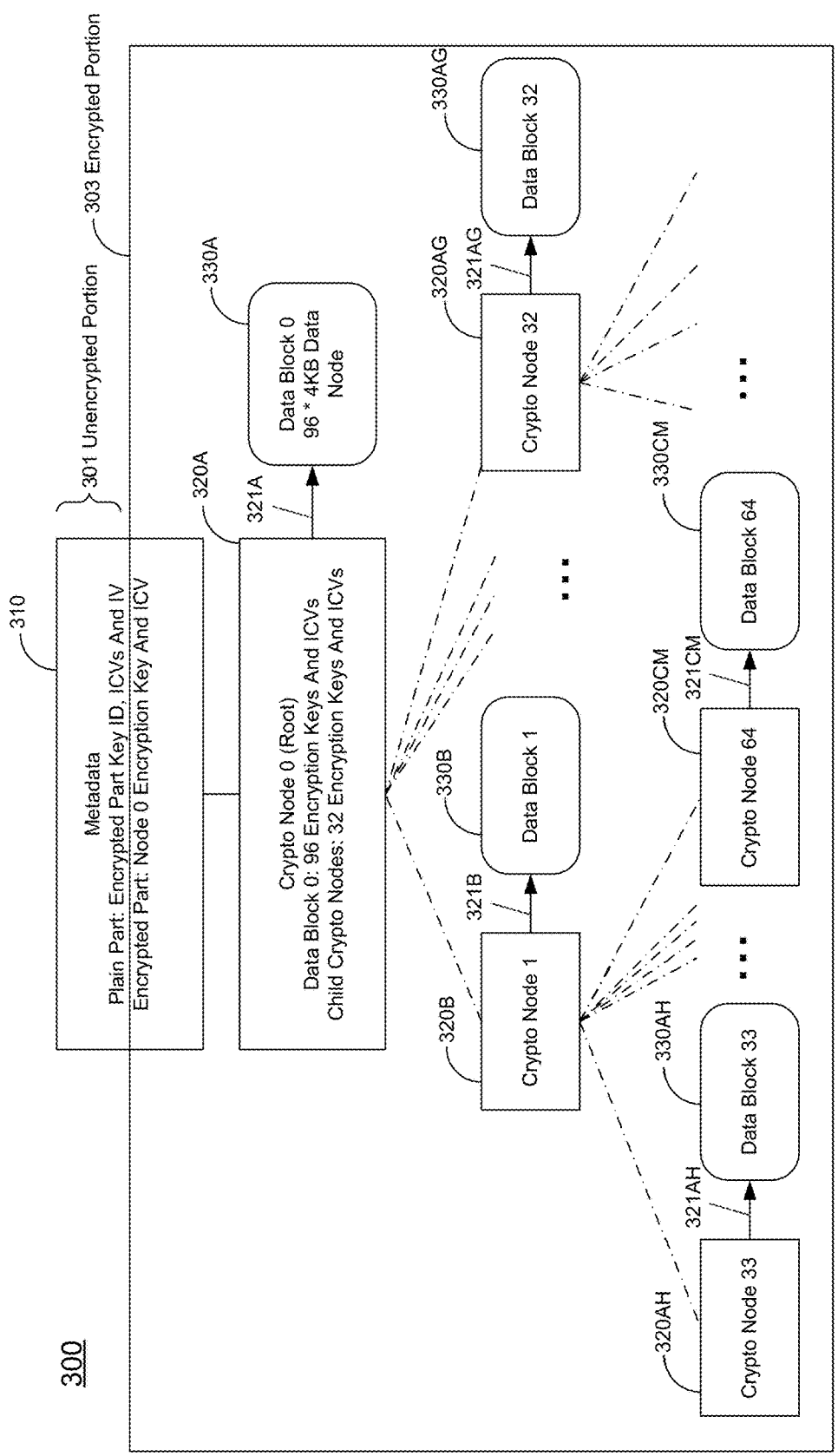
FIG. 3 is a block diagram of a file layout in accordance with one embodiment.

FIG. 3 is a diagram of a file layout in accordance with an embodiment of the invention. File 300 contains an unencrypted portion 301 and an encrypted portion 303. Integrity and confidentiality (encryption keys) information are stored in the same file with the actual user data, and are maintained as the file is being used.

In the tree layout, three types of nodes may be included: (1) a single metadata node, (2) cryptographic nodes, and (3) data nodes. The metadata node contains general information about the file, and the root node of the tree is the first cryptographic node. Each level of the tree is occupied by at least one cryptographic node, where each cryptographic node has an attached, or associated, data node. In the example shown in FIG. 3, file 300 includes metadata node 310; cryptographic nodes, such as the root cryptographic node 0 320A; and data nodes, which are grouped into data blocks, such as data block 0 330A. Data block 0 330A is associated with root cryptographic node 0 320A and resides within the same level of the tree.

In the example shown in FIG. 3, a data block is made up of 96 4 KB data nodes. In one embodiment, each data node's size is fixed (e.g., containing up to 4 KB of data (a default page size, although other sizes may be chosen and the number of data nodes within a data block may vary as well)). Because of the fixed size of data nodes, random access to a certain data node can be easily accomplished using fixed offsets.

Referring again to FIG. 3, metadata node 310 includes an unencrypted "plain" part, which includes a key identifier. In one embodiment, the key identifier is a random value used to generate the encryption key from a sealing key for a secure enclave, such as secure enclave 218 of FIG. 2, in which the file is being processed. In another embodiment, a user of file 300 provides a sealing key for file 300, and the user must supply the sealing key each time that the user reads data from or writes data to file 300. The key identifier is replaced every time file 300 is updated, which results in a new encryption key generated for every update to file 300.

The unencrypted part of metadata node 310 also includes an integrity check value to confirm the integrity of the encryption key for file 300. In one embodiment, integrity check values are Galois Message Authentication Codes (GMACs). The unencrypted part of metadata node 310 also includes an initialization vector IV, which is input to a key derivation function to determine the encryption key for the file 300. As noted above, in one embodiment, the encryption key is generated from a sealing key for a secure enclave, such as secure enclave 218 of FIG. 2, in which the file is being processed.

The unencrypted "plain" part of metadata node 310 is the only portion of the file 300 that is unencrypted. The remainder of the data file 300 is encrypted, including an encrypted part of the metadata node 310, all cryptographic nodes, and all data nodes.

The encrypted part of metadata node 310 includes the encryption key of the root cryptographic node, an integrity check value (e.g., a GMAC) of the root cryptographic node, and, in one embodiment, 3 KB of user data. For very small file sizes, the inclusion of user data in the metadata node enables the file to be processed without overhead of traversing the file layout tree.

The nodes included in file 300 below metadata node 310 include encrypted user data, as well as encrypted integrity and confidentiality (encryption keys) information for the encrypted user data. Each parent cryptographic node includes confidentiality (encryption keys) and integrity information for its child cryptographic nodes.

In the example shown in FIG. 3, each cryptographic node is illustrated with an "illustrative pointer" to its associated data block, although physical pointers are not necessary to implementation and the illustrative pointers are shown for illustration purposes only. In one embodiment, because the size of each node in file 300 is fixed, the offsets for each cryptographic node are known. For example, if each node is of size 4 KB, the file layout will include a 4 KB metadata node, followed by a sequence of [4 KB cryptographic node, 96*4 KB data nodes] [4 KB cryptographic node, 96*4 KB data nodes] [4 KB cryptographic node, 96*4 KB data nodes], etc.

Referring again to FIG. 3, each cryptographic node also stores the corresponding encryption keys and integrity check values for each of the data nodes contained in its associated data block. For example, crypto node 0 320A is shown with an illustrative pointer 321A to its associated data block 0 330A. Crypto node 0 320A also contains 96 encryption key/integrity check value pairs, one pair for each of the 96 data nodes in its associated data block 0 330A. Similarly, crypto node 1 320B contains a pointer 321B to its respective data block 1 330B, as well as 96 encryption key/integrity check value pairs for the 96 data nodes within data block 1 330B (not shown). As another example, cryptographic node 0 (root) 320A resides in address 4 KB-8 KB in the file, and the first encryption key/integrity check value from this crypto node belongs to its first data node 330A, which resides at addresses 8 KB-12 KB.

In addition to encryption key/integrity check value pairs for the data nodes contained in the associated data block, each cryptographic node includes integrity and confidentiality information for its children cryptographic nodes. For example, crypto node 0 (root) 320A includes one encryption key/integrity check value pair for each of the 32 children cryptographic nodes 320B through 320AG that are its children cryptographic nodes. These parent/child cryptographic node relationships are represented in FIG. 3 by a dash-dot line pattern. Similarly, crypto node 1 320B contains one encryption key/integrity check value pair for each of its 32 children cryptographic nodes, crypto node 33 320AH through crypto node 64 320CM.

Unlike a traditional hash tree file layout, where the data is stored only in the leaf nodes, in this modified tree layout, data is stored on every layer of the tree. This file structure allows the file to grow, without the need to reserve space for children nodes, or to re-structure the file every time a new layer is added to the tree. These limitations of the regular hash tree approach are usually solved by using a separate integrity file. However, the present disclosure embeds integrity information into the data file along with the encrypted data.

In one embodiment, the file layout is fixed, and the tree grows in layers, so there is no limit on the file size. User's data is in fixed offsets, so each data node can be accessed directly. In order to verify the integrity of the data node, only the parent cryptographic nodes (up to the root cryptographic node) are read and verified.

Figure 4:
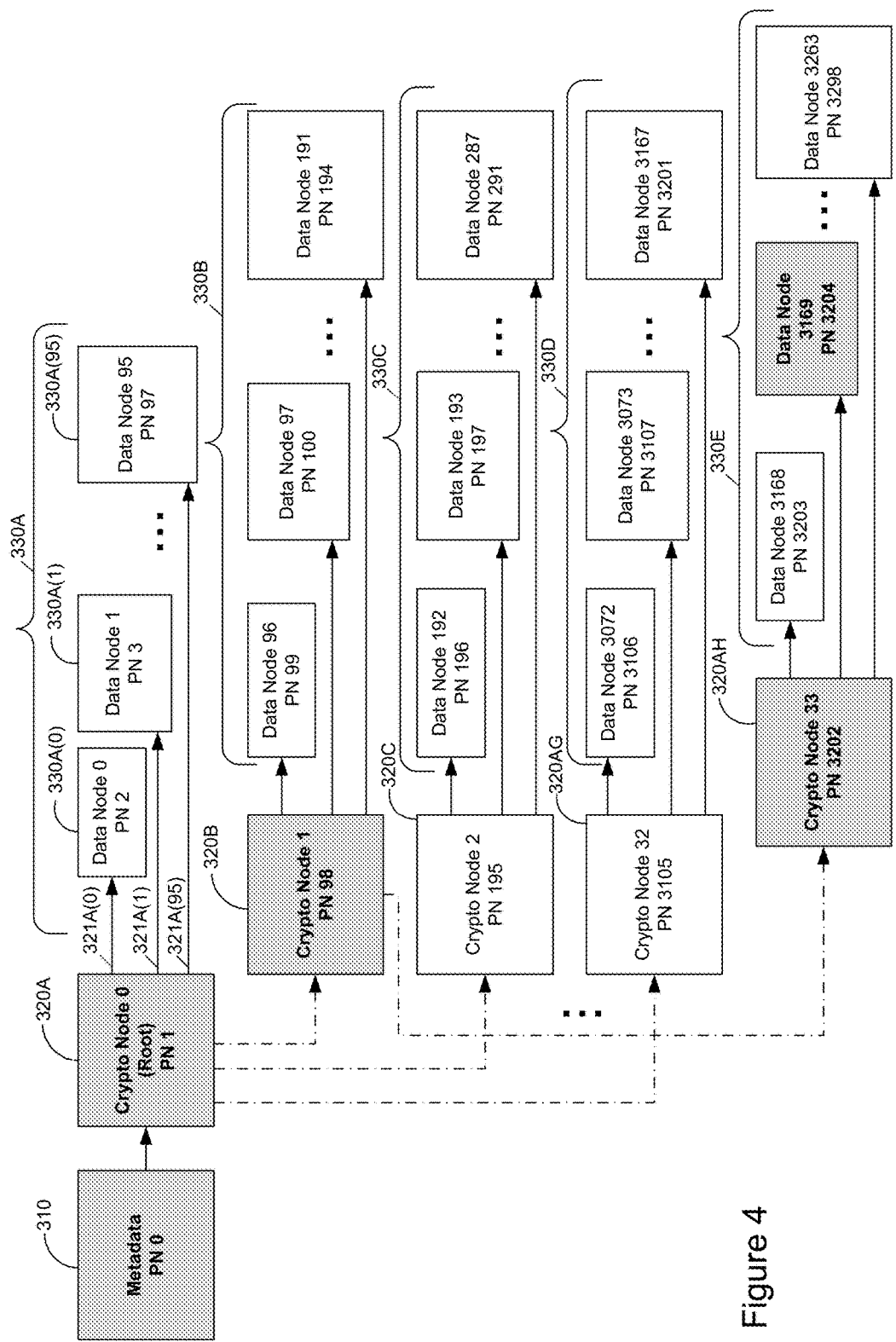
FIG. 4 is another block diagram of the file layout of FIG. 3 in accordance with one embodiment.

FIG. 4 shows another view of the file layout of FIG. 3. Each of the nodes of FIG. 3 is marked with a corresponding physical node number (PN). The physical node number (PN) refers to the actual physical node number in the actual file, where the metadata node is node 0 (the first 4 KB) of the file, crypto node 0 (root) is node 1 (the second 4 KB) of the file, etc. This drawing shows the mapping of physical (actual) node numbers to the cryptographic nodes and data nodes.

For example, metadata node 310 is shown as physical node (PN) 0; crypto node 0 (root) 320A is shown as physical node (PN) 1; data block 0 330A is shown as being made up of 96 physical nodes 2 through 97, including data node 0/physical node 2; data node 1/physical node 3; intermediary data nodes 2-94/physical nodes 4-96 represented by the ellipsis; and data node 95/physical node 97. The relationships from cryptographic node 0 (root) 320A to each of the data nodes included in data block 0 330A are illustrated using illustrative pointers 321A(0), 321A(1), and 321A(95), although physical pointers need not be present in the data file for implementation. (For clarity of the drawing, other pointers from cryptographic nodes to data nodes are not labeled in FIG. 4.)

As in FIG. 3, parent/child cryptographic node relationships in FIG. 4 are represented by a dash-dot line pattern. Again, the dash-dot line pattern does not necessarily correspond to a physical pointer in the data file, but rather is used for illustrative purposes only. For example, the parent/child relationship between crypto node 0 (root) 320A/physical node 1 and crypto node 1 320B/physical node 98 is shown as an arrow with a dash-dot line pattern.

With the layout of a file as described above for file 300, it is straightforward to translate the user's data offset to real physical offsets within file 300. For example, consider the following formulas:

Assume the following constant values:
MD_USER_DATA_SIZE=3 KB
NODE_SIZE=4 KB
ATTACHED_DATA_NODES_COUNT=96

Use the following formulas to calculate the user's data offset to a real physical offset within file 300:

```
data_node_number = (offset - MD_USER_DATA_SIZE) / NODE_SIZE;
crypto_node_number = data_node_number / ATTACHED_DATA_NODES_COUNT;
physical_data_node_number = data_node_number
    + 1 // meta data node
    + 1 // crypto root
    +   crypto_node_number; // number of crypto nodes in the middle (the root
        crypto_node_number is 0)
physical_crypto_node_number = physical_data_node_number
    - (data_node_number % ATTACHED_DATA_NODES_COUNT) // now we are at the
                                                     // first data node
                                                     // attached to this
                                                     // crypto node
    - 1;           // and now at the crypto node itself.
```

Figures 5, 6:
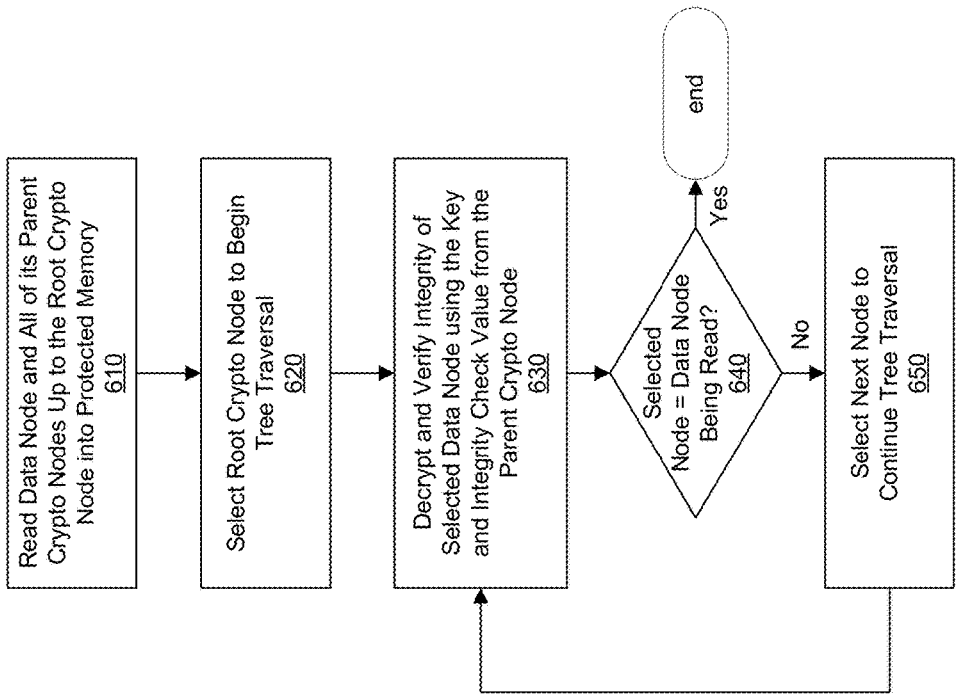
FIG. 5 is a flowchart of a method for opening a file structured in accordance with the file layout of FIGS. 3 and 4.
FIG. 6 is a flowchart of a method for reading a file structured in accordance with the file layout of FIGS. 3 and 4.

Referring to FIG. 5, a flowchart is shown of a method for opening a file structured in accordance with the file layout of FIGS. 3 and 4 is shown. At "Read Metadata Node into Protected Memory" block 510, the metadata node, such as metadata node 310 of FIGS. 3 and 4, is read into protected memory, such as protected memory 216P of FIG. 2. At "Re-Create the Metadata Encryption Key from the Key ID" block 520, the metadata encryption key can be recreated from the key ID stored in the unencrypted "plain" part of the metadata node. The metadata encryption key may be recreated using a sealing key for a secure enclave processing the file (or other method depending on the security platform). At "Decrypt and Verify the Integrity of the Metadata Node Encrypted Part" block 530, the metadata encryption key is used to decrypt the encrypted part of the metadata node, which contains the Node 0 (root node) Encryption Key and Integrity Check Value (ICV). For example, the ICV may be a Galois Message Authentication Code (GMAC) that was calculated and stored from the root node encryption key before the root node encryption key was encrypted. The ICV/GMAC can be re-computed from the decrypted root node encryption key and compared to the stored ICV/GMAC value to verify the integrity of the decrypted root node encryption key.

At "Read the File's Root Crypto Node into Encrypted Memory" block 540, the root cryptographic node is read into encrypted memory. At "Decrypt and Verify the Integrity of the Root Crypto Node Using the Key and Integrity Check Value from the Metadata Node" block 550, the file's root crypto node is decrypted using the decrypted root node key obtained above at block 530. For example, the ICV may be a Galois Message Authentication Code (GMAC) that was calculated from the root crypto node before the root crypto node was encrypted. The ICV/GMAC can be re-computed from the decrypted root node and compared to the stored ICV/GMAC value to verify the integrity of the decrypted root crypto node.

Referring back to FIG. 4, the file layout illustrated in FIGS. 3 and 4 can be used to read or modify a selected data node within the file by reading or modifying only the ancestor nodes of the selected data node. For example, to read data node 3169/physical node 3204 (shown with a gray background), the encryption key/integrity check value pair is read from crypto node 33 320AH/physical node 3202 (also shown with a gray background). The identified encryption key is used to decrypt the data in data node 3169/physical node 3204, and the integrity check value is used to confirm the integrity of the decrypted data. However, because crypto node 33 320AH/physical node 3202 is itself encrypted, its encrypted key and integrity check value pair first must be obtained from its parent node, crypto node 1 320B/physical node 98 (also shown with a gray background), and so forth, traversing up the tree through crypto node 0 (root) 320A/physical node 1 to the metadata node 310/physical node 0.

FIG. 6 is a flowchart for reading a selected data node within a file structured in accordance with the file layout of FIGS. 3 and 4. In "Read Data Node and All of its Parent Crypto Nodes up to the Root Crypto Node into Protected Memory" block 610, the selected data node and all of its parent crypto nodes up to the root crypto node are read into the protected memory. A traversal of the tree layout begins with "Select Root Crypto Node to Begin Tree Traversal" block 620. Control then proceeds to "Decrypt and Verify Integrity of Selected Data Node using the Key and Integrity Check Value from the Parent Crypto Node" block 630. The traversal begins with the root crypto node, so that the "parent crypto node" is the encrypted portion of the metadata node. As described above with respect to FIG. 5, the file's root crypto node is decrypted using the decrypted root node key obtained above at block 530 when the file was opened for reading. The associated ICV for the root crypto node may be a Galois Message Authentication Code (GMAC) that was calculated from the root crypto node before the root crypto node was encrypted. The ICV/GMAC can be re-computed from the decrypted root node and compared to the stored ICV/GMAC value to verify the integrity of the decrypted root crypto node. After confirming the integrity of the root crypto node, control proceeds to "Selected Data Node=Data Node Being Read?" decision point 640. If the tree traversal has not yet reached the data node being read, control proceeds to "Select Next Node to Continue Tree Traversal" block 650. After the root crypto node has been processed, the next node to be selected is the child crypto node that is on the next level of the tree (level 2; in the example of FIGS. 3 and 4, level 2 contains crypto nodes 1 through 32). Referring to FIG. 4, when reading data node 3169/physical node 3204 (shown with a gray background), the next physical node to be read after the root crypto node (physical node 1) is physical node 98/cryptographic node 1.

Referring again to FIG. 6, from "Select Next Node to Continue Tree Traversal" block 650, control returns to "Decrypt and Verify Integrity of Selected Data Node using the Key and Integrity Check Value of the Parent Crypto Node" block 630, where physical node 98 will be decrypted and the integrity will be confirmed using the key and integrity check value of the parent crypto node, physical node 1. The subsequent loop iteration will then select physical node 3202, which will be decrypted and verified using the key/ICV of physical node 98. In the final iteration of the loop, physical node 3204 will be selected, decrypted and verified using the key/ICV of physical node 3202.

Figure 7:
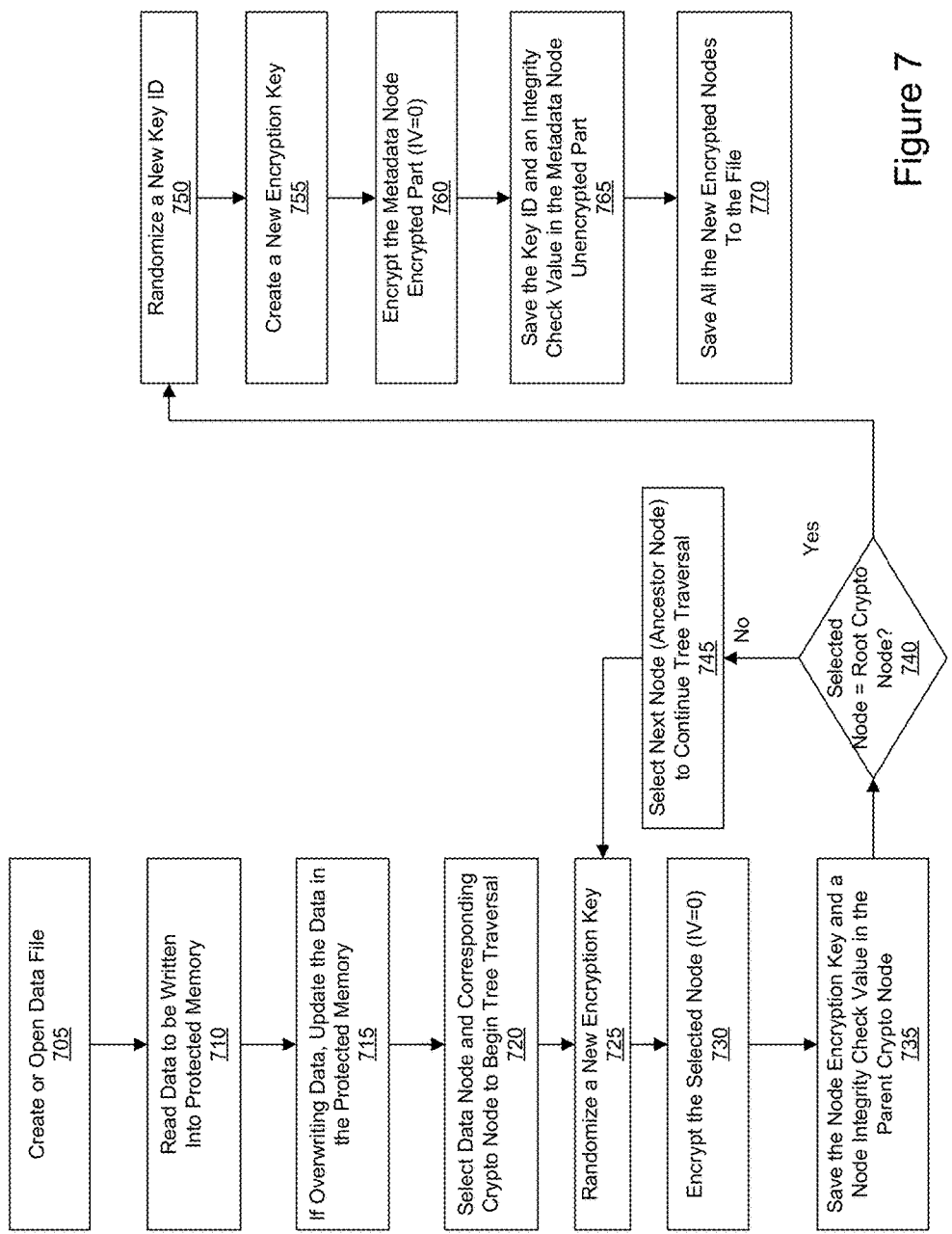
FIG. 7 is a flowchart of a method for writing data to a file structured in accordance with the file layout of FIGS. 3 and 4.

FIG. 7 is a flowchart of a method for writing data to a file structured in accordance with the file layout of FIGS. 3 and 4. At "Create or Open Data File" block 705, a data file structured in accordance with the file layout of FIGS. 3 and 4 is created if the data file does not already exist or opened if the data file exists. If the data file is to be created, the data file is created in accordance with a tree file layout as described with reference to FIGS. 3 and 4. According to the file layout, the data file may include at least one encrypted data node and at least one encrypted cryptographic node, where each encrypted cryptographic node corresponds to a respective encrypted data node. Each encrypted cryptographic node may include a respective encryption key/integrity check value pair for the respective encrypted data node. Each encrypted cryptographic node may also include child cryptographic encryption key/integrity check value pairs corresponding to child cryptographic nodes of the encrypted cryptographic node.

The data file may also include a metadata node with metadata for the data file. The metadata node may include an encrypted portion and an unencrypted, or "plain," portion. The encrypted portion of the metadata node may include a root cryptographic node encryption key for a root cryptographic node and a root cryptographic integrity check verification value for the root cryptographic node encryption key. The metadata node may also include an unencrypted portion containing a key identifier used to generate an encryption key for the encrypted portion of the metadata node and an integrity check verification value for the encryption key for the encrypted portion of the metadata node.

From "Create or Open Data File" block 705, control proceeds to "Read Data to be Written into Protected Memory" block 710. Data to be written to the data file are read into protected memory, such as protected memory 216P of FIG. 2. Control proceeds to "If Overwriting Data, Update the Data in the Protected Memory" block 715, where the data are updated in the protected memory if data in the data file is to be overwritten.

When data is written to a selected encrypted data node, the respective encryption key for the selected encrypted data node is regenerated. Furthermore, the respective encryption key is updated for each ancestor encrypted cryptographic node of the selected encrypted data node. This process begins with "Select Data Node and Corresponding Crypto Node to Begin Tree Traversal" block 720. The data node to which data are to be written is selected as the initial data node to be processed, and the corresponding cryptographic node is also selected. The tree will be traversed from the selected cryptographic node up to the root cryptographic node to update the encryption key/ICV pairs for each cryptographic node in the traversal path.

From "Select Data Node and Corresponding Crypto Node to Begin Tree Traversal" block 720, control proceeds to "Randomize a New Encryption Key" block 725. During the tree traversal, the encryption key for the selected data node is updated during the first pass. A new encryption key for the selected data node is generated, and control proceeds to "Encrypt the Selected Node (IV=0)" block 730. The selected node is encrypted, which initially saves the data to be written to the data file as part of the encrypted selected node in memory. Because the encryption key for each data node is updated for every write operation, it is not necessary to use a different initialization vector (IV) to encrypt the data node. Consequently, an initialization vector value of zero may be used.

From "Encrypt the Selected Node (IV=0)" block 730, control then proceeds to "Save the Node Encryption Key and a Node Integrity Check Value in the Parent Crypto Node" block 735, where the newly-generated encryption key and an integrity check value (ICV) are saved in the corresponding (parent) cryptographic node. In one embodiment, the ICV is the resulting Galois Message Authentication Code (GMAC) for Advanced Encryption Standard Galois Counter Mode (AES-GCM) encryption.

If the currently selected node is the root cryptographic node, the root node encryption key/ICV pair is saved in the encrypted part of the metadata node, such as encrypted part 303 of metadata node 310 of FIGS. 3 and 4. Control then proceeds to "Selected Node=Root Crypto Node?" decision point 740, where a determination is made whether the selected node being processed is the root crypto node. If not, control proceeds to "Select Next Node (Ancestor Node) to Continue Tree Traversal" block 745, where the ancestor of the previously-selected cryptographic node is selected for further processing. In an embodiment where each node in the tree file layout is of fixed size, the ancestor node can be accessed using fixed offsets into the data file. A wide tree can be used, so that the number of layers in the tree is small, and thus a given data node has only a few ancestors. Control proceeds from "Selected Node=Root Crypto Node?" decision point 740 to "Randomize a New Encryption Key" block 725.

After the first pass of the loop beginning with "Randomize a New Encryption Key" block 725, where the encryption keys are generated for the selected data node, subsequent iterations of the loop will update the encryption key for each ancestor cryptographic node. In other words, at "Randomize a New Encryption Key" step 725, the first pass regenerates the encryption key for the data node. On the next pass, when the first ancestor node is selected at Select Next Node (Ancestor Node) to Continue Tree Traversal" block 745, the encryption key that is updated is the encryption key for the cryptographic node.

At "Selected Node=Root Crypto Node" decision point 740, if the tree traversal has reached the root cryptographic node, control proceeds to "Randomize a New Key ID" block 750, where a new key ID for the entire file is generated. A new encryption key for the metadata node is created in "Create a New Encryption Key" block 755, and the encrypted part of the metadata node is encrypted using an initialization vector of 0 in "Encrypt the Metadata Node Encrypted Part (IV=0)" block 760. Control proceeds to "Save the Key ID and an Integrity Check Value in the Metadata Node Unencrypted Part" block 765. The key identifier and an integrity check value for the key identifier are saved in the unencrypted part of the metadata node. Control continues to "Save All the New Encrypted Nodes to the File" block 770, where the values of each node processed during the tree traversal are saved from protected memory into the data file.

In addition to the inventive file layout, the encryption scheme is also novel. In accordance with the NIST specification requirement that an encryption key be used only a limited number of times, the encryption keys stored within the data file are used only once. In other words, the encryption keys are generated using a key derivation function for a given data node for each write operation to that data node. The file can be encrypted any number of times and is not limited by the NIST specification since each encryption key is used only once. In one embodiment, the encryption scheme uses well known cryptographic primitives (AES-GCM, with 128 bit keys and GMACs), although other forms of encryption may also be used. The initialization vector (IV) can be set to 0, so there is no need to save the IV within the data file.

This encryption scheme also allows easy file duplication and distribution. When a file is duplicated, data modified by the user in his copy of the file is encrypted with new encryption keys, all the way up to the root. This approach prevents other users of the duplicated file from decrypting and reading another user's changes, even though all users have all the original file keys. In this way, each user's data is protected from other users. Encrypted files can be ported from one machine to another without re-encrypting the entire file for each target machine. When porting a file from one machine to another, only the last-used metadata key is provisioned to the destination machine, and the file can be used in the destination without further revision because all of the other keys are part of the file itself.

In one embodiment, the file metadata node (which holds the encryption key for the tree root cryptographic node) is generated with Intel® Software Guard Extensions (SGX) mechanisms and protected with SGX technology, but this protection scheme can be adjusted for any other secure execution environment.

Embodiments allow trusted runtime environments, such as Intel's SGX, to save a file in the untrusted file system, and ensure that the file is protected, as both confidentiality and integrity of the data are guaranteed. The file size is not limited, and the file can be used normally (e.g., random access for read and write), with minimal overhead in both storage and performance. The encryption scheme meets official standards such as NIST specification SP 800-38D, Recommendation for Block Cipher Modes of Operation: Galois/Counter Mode (GCM) and GMAC (November 2007), which is available at http://dx.doi.org/10.6028/NIST.SP.800-38D (redirects to http://nvlpubs.nist.gov/nistpubs/Legacy/SP/nistspecialpublication800-38Dpdf).

Several performance enhancements have been made to implementations using the file layout described herein. In one embodiment, the first 3 KB of the user's data are in the metadata node, so small files are always 4 KB in disk size, and do not have any 'tree' overhead.

To reduce I/O operations, as long as the file is open, the metadata node and root cryptographic node can remain in encrypted memory. Because the metadata node and root cryptographic node are needed for every read/write operation, performance is enhanced by reducing I/O operations to the file.

Cache is also used to reduce the overhead caused by the need to read and write the tree nodes (cryptographic data) in addition to the user's data nodes. The cryptographic nodes can be read once from the disk and then used many times (especially if data is read sequentially). For write operations, the cache is allowed to become full before changes are flushed to disk. This practice ensures that all of the updated cryptographic nodes and the metadata node are written only once for many write operations.

For example, when the cache is flushed, the cryptographic nodes for each modified data node are not updated separately. This approach would result in a large amount of overhead. For example, if a cryptographic node has 100 updated children data nodes in the cache, updating each modified data node separately would update the cryptographic node and its parent cryptographic nodes up to the root 100 times.

Instead of updating each modified data node separately, the following approach may be used: (1) Each data node is encrypted separately, where encrypting the data node includes generating a new encryption key, encrypting the data node, and saving the data node encryption key and a corresponding integrity check value (ICV) in the parent cryptographic node; (2) The modified cryptographic nodes are sorted by their respective cryptographic node numbers; (3) The modified cryptographic nodes can be encrypted from last to first, where the first cryptographic node is the root cryptographic node; and (4) The metadata node encrypted portion is encrypted; and (5) All changes are saved to the data file.

This streamlined process ensures that the data file is updated correctly. Once a certain cryptographic node is reached during the tree traversal, its modified children data nodes have been encrypted (per step 1 described above) and all its modified children cryptographic nodes can be updated (because the children node numbers are always larger than the parent node number). By using this process, many nodes can be updated in parallel beginning with the data nodes, then updating the lowest layer of parent cryptographic nodes (the largest node numbers), then updating the next layer of parent cryptographic nodes up to the root cryptographic node.

If the cache flush process is interrupted in the middle, the file is left in a corrupted state. Therefore, a recovery file (with all the nodes that are about to change) is created before changes are written to the disk. If an error occurs during the cache flush process, the file is re-constructed back to a stable state using the recovery file.

On systems where a monotonic counter is available, the scheme can be extended to support replay protection. If anti-replay protection is enabled, the monotonic counter ID and its current value are saved in the metadata node of the file, and incremented whenever new data is flushed to the file. When the file is opened, the monotonic counter value in the file is compared with the monotonic counter value in the system to ensure that a replay has not occurred.

Figure 8:
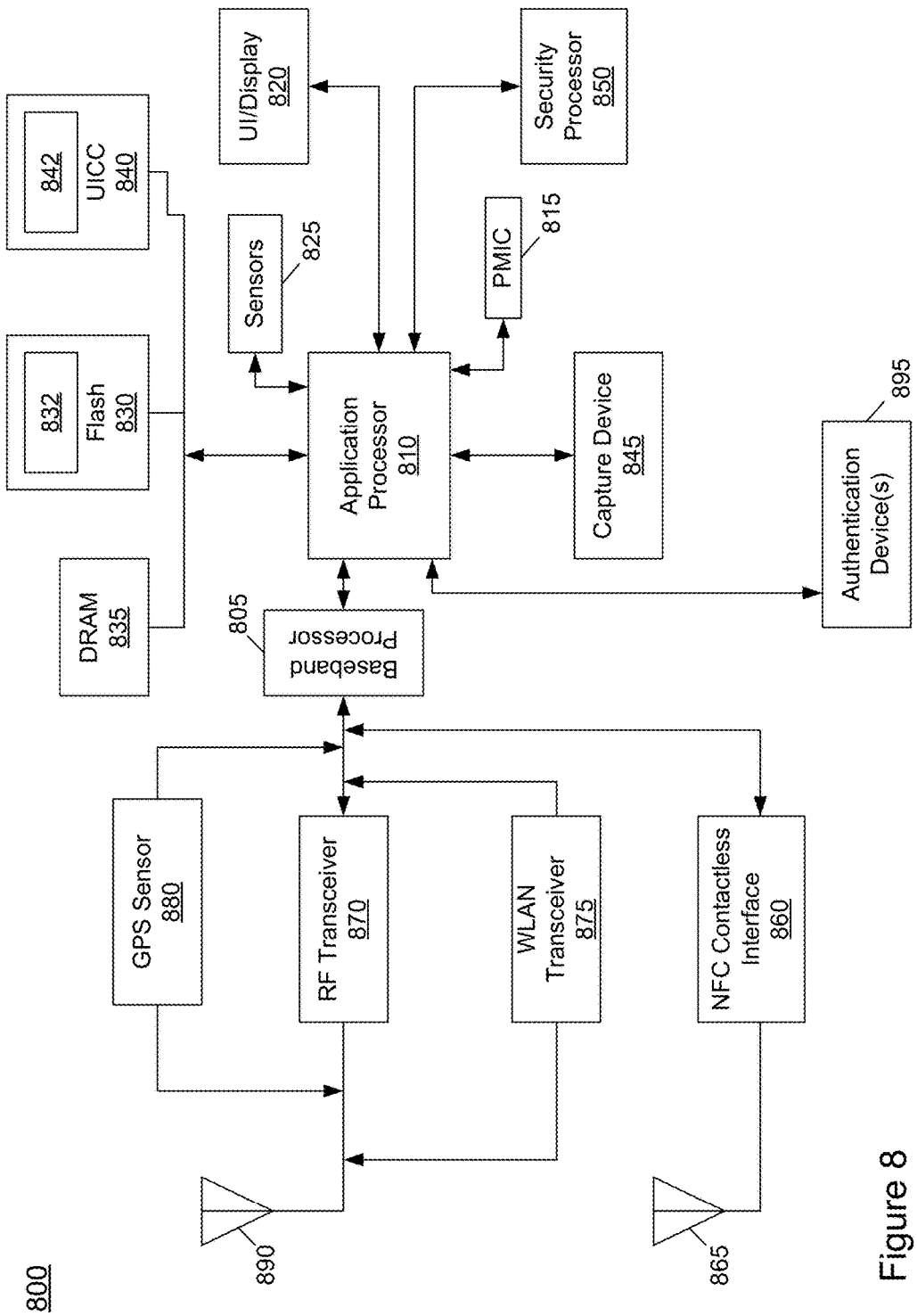
FIG. 8 is a block diagram of a computing device in which embodiments of the invention may be used.

Referring now to FIG. 8, shown is a block diagram of an example system with which embodiments can be used. As seen, system 800 may be a smartphone or other wireless communicator or any other IoT device. A baseband processor 805 is configured to perform various signal processing with regard to communication signals to be transmitted from or received by the system. In turn, baseband processor 805 is coupled to an application processor 810, which may be a main CPU of the system to execute an OS and other system software, in addition to user applications such as many well-known social media and multimedia apps. Application processor 810 may further be configured to perform a variety of other computing operations for the device, including the data file operations described herein.

In turn, application processor 810 can couple to a user interface/display 820, e.g., a touch screen display. In addition, application processor 810 may couple to a memory system including a non-volatile memory, namely a flash memory 830 and a system memory, namely a DRAM 835. In some embodiments, flash memory 830 may include a secure portion 832 in which keys, other secrets and other sensitive information may be stored and operated. One or more of these storages may store a package for performing the data file operations described herein. As further seen, application processor 810 also couples to a capture device 845 such as one or more image capture devices that can record video and/or still images.

Still referring to FIG. 8, a universal integrated circuit card (UICC) 840 comprises a subscriber identity module, which in some embodiments includes a secure storage 842 to store secure identity information. System 800 may further include a security processor 850 that may that may implement a trusted execution environment (TEE), and which may couple to application processor 810. Furthermore, application processor 810 may implement a secure mode of operation, such as Intel® Software Guard Extensions (SGX) to a given instruction set architecture, and circuitry for hosting of a TEE. A plurality of sensors 825, including one or more multi-axis accelerometers may couple to application processor 810 to enable input of a variety of sensed information such as motion and other environmental information. In addition, one or more authentication devices 895 may be used to receive, e.g., user biometric input for use in authentication operations.

As further illustrated, a near field communication (NFC) contactless interface 860 is provided that communicates in a NFC near field via an NFC antenna 865. While separate antennae are shown in FIG. 8, understand that in some implementations one antenna or a different set of antennae may be provided to enable various wireless functionality.

A power management integrated circuit (PMIC) 815 couples to application processor 810 to perform platform level power management. To this end, PMIC 815 may issue power management requests to application processor 810 to enter certain low power states as desired. Furthermore, based on platform constraints, PMIC 815 may also control the power level of other components of system 800.

To enable communications to be transmitted and received such as in one or more IoT networks, various circuitry may be coupled between baseband processor 805 and an antenna 890. Specifically, a radio frequency (RF) transceiver 870 and a wireless local area network (WLAN) transceiver 875 may be present. In general, RF transceiver 870 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 880 may be present, with location information being provided to security processor 850, which may be used in certain security operations. Other wireless communications such as receipt or transmission of radio signals, e.g., AM/FM and other signals may also be provided. In addition, via WLAN transceiver 875, local wireless communications, such as according to a Bluetooth™ or IEEE 802.11 standard can also be realized.

Figure 9:
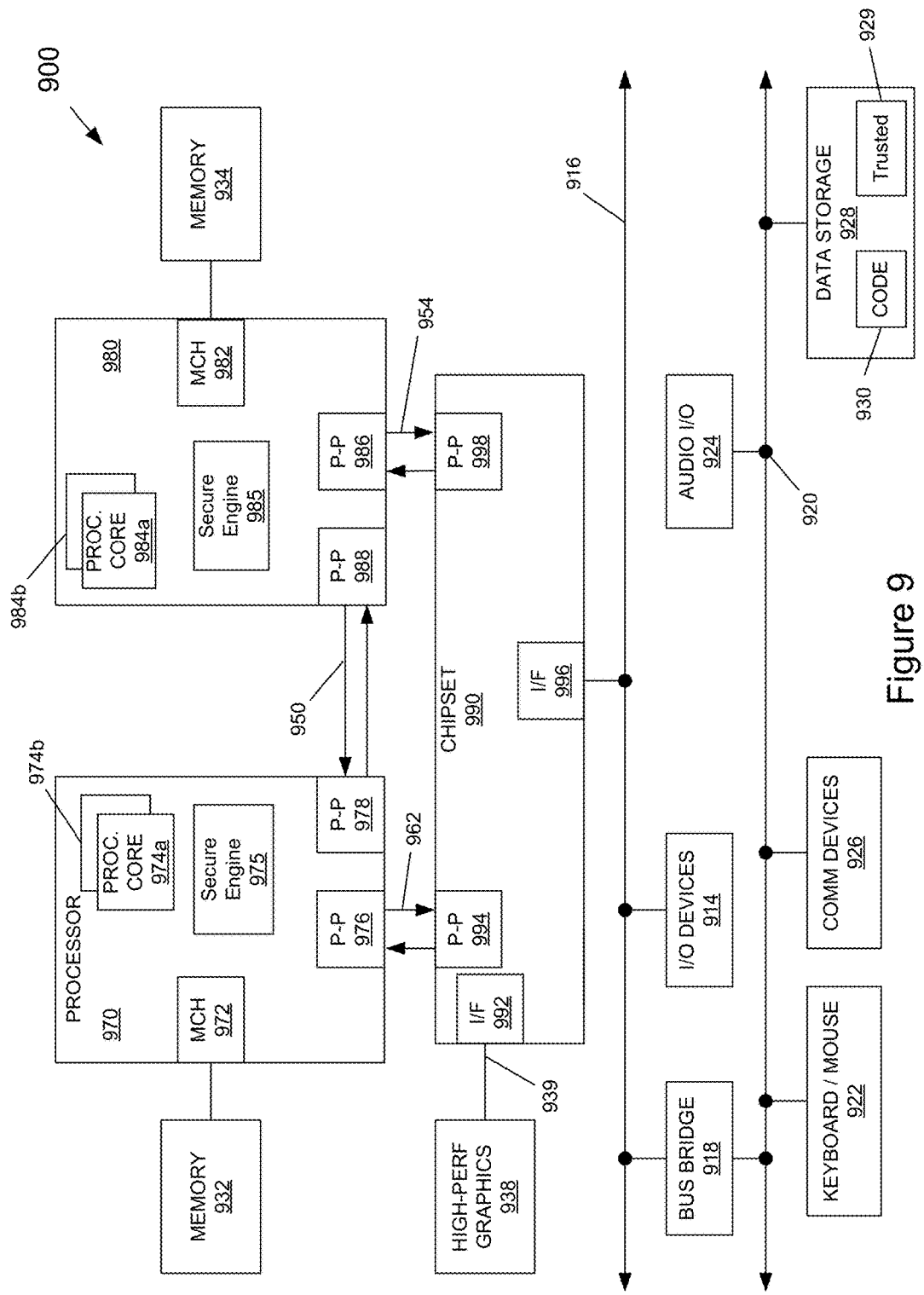
FIG. 9 is a block diagram of a computing device in which embodiments of the invention may be used.

Referring now to FIG. 9, shown is a block diagram of a system in accordance with another embodiment of the present invention. As shown in FIG. 9, multiprocessor system 900 can be configured to implement the data file operations described herein and may be implemented as a point-to-point interconnect system such as a server system. System 900 includes a first processor 970 and a second processor 980 coupled via a point-to-point interconnect 950. As shown in FIG. 11, each of processors 970 and 980 may be multicore processors such as SoCs, including first and second processor cores (i.e., processor cores 974a and 974b and processor cores 984a and 984b), although potentially many more cores may be present in the processors. In addition, processors 970 and 980 each may include a secure engine 975 and 985 to perform the data file operations as described herein.

Still referring to FIG. 9, first processor 970 further includes a memory controller hub (MCH) 972 and point-to-point (P-P) interfaces 976 and 978. Similarly, second processor 980 includes a MCH 982 and P-P interfaces 986 and 988. MCH's 972 and 982 couple the processors to respective memories, namely a memory 932 and a memory 934, which may be portions of main memory (e.g., a DRAM) locally attached to the respective processors. First processor 970 and second processor 980 may be coupled to a chipset 990 via P-P interconnects 952 and 954, respectively. As shown in FIG. 9, chipset 990 includes P-P interfaces 994 and 998.

Furthermore, chipset 990 includes an interface 992 to couple chipset 990 with a high performance graphics engine 938, by a P-P interconnect 939. In turn, chipset 990 may be coupled to a first bus 916 via an interface 996. Various input/output (I/O) devices 914 may be coupled to first bus 916, along with a bus bridge 918 which couples first bus 916 to a second bus 920. Various devices may be coupled to second bus 920 including, for example, a keyboard/mouse 922, communication devices 926 and a data storage unit 928 such as a non-volatile storage or other mass storage device. As seen, data storage unit 928 may include code 930, in one embodiment, including code for performing the data file operations described herein. As further seen, data storage unit 928 also includes a trusted storage 929 to store sensitive information to be protected. Further, an audio I/O 924 may be coupled to second bus 920.

Figure 10:
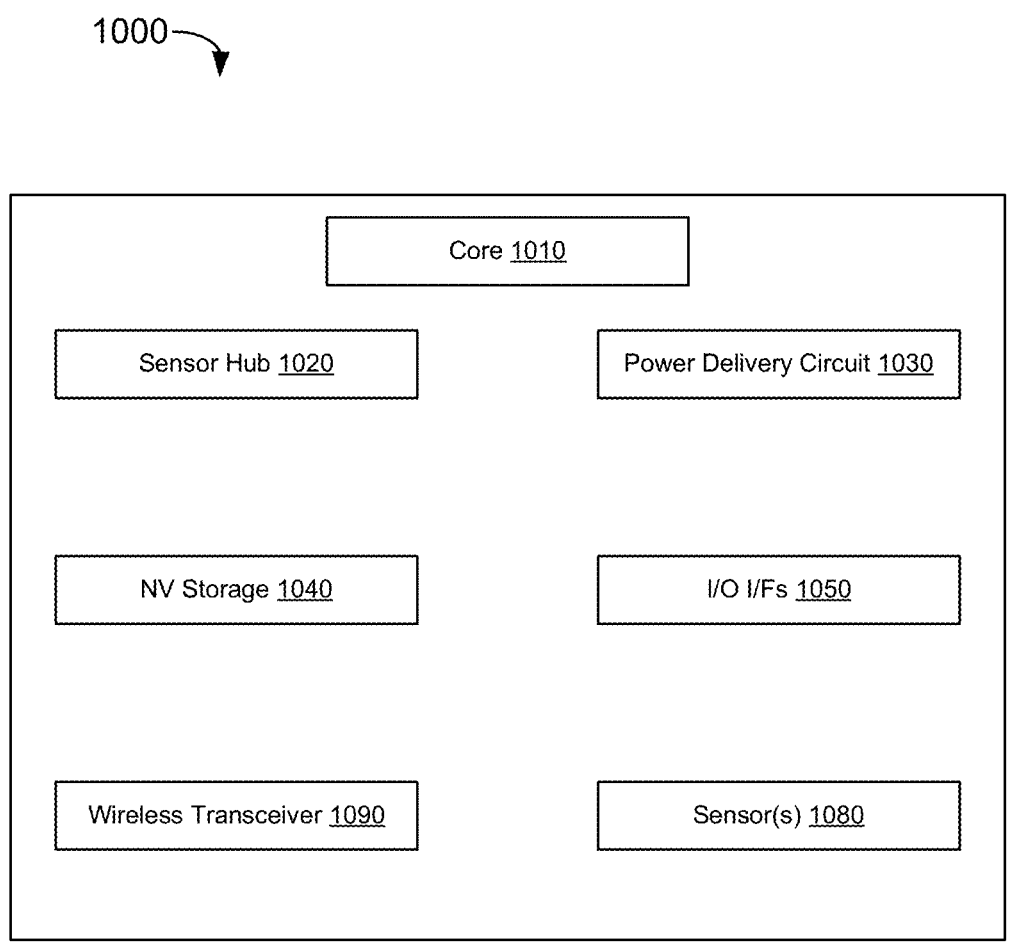
FIG. 10 is a block diagram of a computing device in which embodiments of the invention may be used.

Embodiments may be used in environments where IoT devices may include wearable devices or other small form factor IoT devices such as an actuator and/or sensor. Referring now to FIG. 10, shown is a block diagram of a module 1000 in accordance with another embodiment. In one particular implementation, module 1000 may be an Intel® Curie™ module that includes multiple components adapted within a single small module. Module 1000 may be configured to participate in the data file operations with minimal overhead, as described herein. As seen, module 1000 includes a core 1010 (of course in other embodiments more than one core may be present). Such core may be a relatively low complexity in-order core, such as based on an Intel Architecture® Quark™ design. In some embodiments, core 1010 may implement a TEE as described herein. Core 1010 couples to various components including a sensor hub 1020, which may be configured to interact with a plurality of sensors 1080, such as one or more biometric, motion environmental or other sensors. A power delivery circuit 1030 is present, along with a non-volatile storage 1040. In an embodiment, this circuit may include a rechargeable battery and a recharging circuit, which may in one embodiment receive charging power wirelessly. One or more input/output (IO) interfaces 1050, such as one or more interfaces compatible with one or more of USB/SPI/I²C/GPIO protocols, may be present. In addition, a wireless transceiver 1090, which may be a Bluetooth™ low energy or other short-range wireless transceiver is present to enable wireless communications as described herein. Understand that in different implementations an IoT module can take many other forms, that have, in comparison with a typical general purpose CPU or a GPU, a small form factor, low power requirements, limited instruction sets, relatively slow computation throughput, or any of the above.

The following Examples pertain to further embodiments.

In Example 1, a system to protect a data file includes a processor and a memory coupled to the processor, where the memory comprises instructions that, when executed, cause a computer to: select an encrypted node of a data file for writing data, where the encrypted node is an encrypted data node; generate a node encryption key for the selected encrypted node; encrypt the selected encrypted node with the node encryption key; save the node encryption key and a node integrity check value for the node encryption key in a parent encrypted cryptographic node; select an ancestor encrypted cryptographic node as the selected encrypted node; repeat the generating, encrypting, saving, and selecting the ancestor encrypted cryptographic node until the selected ancestor encrypted cryptographic node is a root encrypted cryptographic node for the data file.

In Example 2, if the selected ancestor encrypted cryptographic node is the root encrypted cryptographic node: the instructions to generate the node encryption key further cause the computer to generate a root cryptographic node encryption key for the root encrypted cryptographic node; and the instructions to save the node encryption key further cause the computer to save the root cryptographic node encryption key in a metadata node of the data file.

In Example 3, if the selected ancestor encrypted cryptographic node is the root encrypted cryptographic node, the instructions further cause the computer to: save the encrypted data node to the data file; and save each ancestor encrypted cryptographic node associated with the encrypted data node to the data file.

In Example 4, the instructions further cause the computer to generate a metadata encryption key for the data file, and update the metadata node of the data file.

In Example 5, the metadata node includes an encrypted portion comprising: the root node encryption key; and a root integrity check value for the root node encryption key; and an unencrypted portion comprising: a key identifier; and a metadata integrity check value; and to update the metadata node further causes the computer to: create the key identifier; generate the metadata encryption key using the key identifier; generate the metadata integrity check value for the metadata encryption key; encrypt the encrypted portion of the metadata node with the metadata encryption key; and save the key identifier and the metadata integrity check value in the unencrypted portion of the metadata node.

In Example 6, if the selected encrypted node is the encrypted data node, the instructions to encrypt the selected encrypted node with the node encryption key further cause the computer to save the data to be written to the encrypted data node.

In Example 7, the instructions to generate the root cryptographic node encryption key further cause the computer to generate the root cryptographic node encryption key from a sealing key of a secure enclave comprising the instructions.

Note that the above processor can be implemented using various means. In an example, the processor comprises a system on a chip (SoC) incorporated in a user equipment touch-enabled device. In another example, a system comprises a display and a memory and includes the processor of one or more of the above examples.

In Example 8, a method to protect a data file includes selecting an encrypted node of a data file for writing data, where the encrypted node is an encrypted data node; generating a node encryption key for the selected encrypted node; encrypting the selected encrypted node with the node encryption key; saving the node encryption key and a node integrity check value for the node encryption key in a parent encrypted cryptographic node; selecting an ancestor encrypted cryptographic node as the selected encrypted node; repeating the generating, encrypting, saving, and selecting the ancestor encrypted cryptographic node until the selected ancestor encrypted cryptographic node is a root encrypted cryptographic node for the data file.

In Example 9, if the selected ancestor encrypted cryptographic node is the root encrypted cryptographic node, generating the node encryption key comprises generating a root node encryption key for the root encrypted cryptographic node; and saving the node encryption key comprises saving the root node encryption key in a metadata node of the data file.

In Example 10, if the selected ancestor encrypted cryptographic node is the root encrypted cryptographic node, the method further comprises saving the encrypted data node to the data file; and saving each ancestor encrypted cryptographic node associated with the encrypted data node to the data file.

In Example 11, the method further includes generating a metadata encryption key for the data file; and updating the metadata node of the data file.

In Example 12, the metadata node comprises: an encrypted portion comprising: the root node encryption key; and a root integrity check value for the root node encryption key; and an unencrypted portion comprising: a key identifier; and a metadata integrity check value. Updating the metadata node further comprises: creating the key identifier; generating a metadata encryption key using the key identifier; generating the metadata integrity check value for the metadata encryption key; encrypting the encrypted portion of the metadata node with the metadata encryption key; and saving the key identifier and the metadata integrity check value in the unencrypted portion of the metadata node.

In Example 13, if the selected encrypted node is the encrypted data node, encrypting the selected encrypted node with the node encryption key further comprises saving the data to be written to the encrypted data node.

In Example 14, generating the root cryptographic node encryption key further comprises generating the root cryptographic node encryption key from a sealing key of a secure enclave comprising the instructions.

In another example, a computer-readable medium including instructions is to perform the method of any of the above examples. In another example, a computer-readable medium including data is to be used by at least one machine to fabricate at least one integrated circuit to perform the method of any one of the above examples.

In another example, an apparatus comprises means for performing the method of any one of the above examples.

In Example 15, at least one computer-readable medium to protect a data file comprises instructions that, when executed by a processor, cause a computer to perform the method of any one of the above examples.

In Example 16, an apparatus to protect a data file comprises means for selecting an encrypted node of a data file for writing data, wherein the encrypted node is an encrypted data node; means for generating a node encryption key for the selected encrypted node; means for encrypting the selected encrypted node with the node encryption key; means for saving the node encryption key and a node integrity check value for the node encryption key in a parent encrypted cryptographic node; means for selecting an ancestor encrypted cryptographic node as the selected encrypted node; and means for repeating the generating, encrypting, saving, and selecting the ancestor encrypted cryptographic node until the selected ancestor encrypted cryptographic node is a root encrypted cryptographic node for the data file.

In Example 17, the means for generating the node encryption key comprises means for generating a root node encryption key for the root encrypted cryptographic node if the selected ancestor encrypted cryptographic node is the root encrypted cryptographic node. The means for saving the node encryption key comprises means for saving the root node encryption key in a metadata node of the data file if the selected ancestor encrypted cryptographic node is the root encrypted cryptographic node.

In Example 18, the apparatus further comprises means for saving the encrypted data node to the data file; and means for saving each ancestor encrypted cryptographic node associated with the encrypted data node to the data file.

In Example 19, the apparatus further comprises means for generating a metadata encryption key for the data file; and means for updating the metadata node of the data file.

In Example 20, the metadata node comprises an encrypted portion including the root node encryption key and a root integrity check value for the root node encryption key. The metadata node further comprises an unencrypted portion including a key identifier and a metadata integrity check value. The means for updating the metadata node further comprises: means for creating the key identifier; means for generating a metadata encryption key using the key identifier; means for generating the metadata integrity check value for the metadata encryption key; means for encrypting the encrypted portion of the metadata node with the metadata encryption key; and means for saving the key identifier and the metadata integrity check value in the unencrypted portion of the metadata node.

In Example 21, the means for encrypting the selected encrypted node with the node encryption key further comprises means for saving the data to be written to the encrypted data node if the selected encrypted node is the encrypted data node.

In Example 22, the means for generating the root cryptographic node encryption key further comprises means for generating the root cryptographic node encryption key from a sealing key of a secure enclave comprising the instructions.

In Example 23, an apparatus to protect a data file includes means to perform the method of any of the above examples.

Understand that various combinations of the above Examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising:
    a processor; and
    at least one computer-readable medium coupled to the processor, wherein the at least one computer-readable medium comprises instructions that, when executed, cause a computer to:
        when processing a data file that comprises data nodes and cryptographic nodes that are to be encrypted before being saved in data storage, write data to a selected node among the data nodes;
        generate a node encryption key for the selected node;
        encrypt the selected node with the node encryption key;
        save the node encryption key and a node integrity check value for the node encryption key in a parent cryptographic node;
        select an ancestor cryptographic node as a next selected node; and
        repeat the generating, encrypting, saving, and selecting the ancestor cryptographic node operations until the selected ancestor cryptographic node is a root cryptographic node for the data file.

2. The system of claim 1, wherein
    if the selected ancestor cryptographic node is the root cryptographic node, the instructions further cause the computer to:
    generate a root cryptographic node encryption key for the root cryptographic node; and
    save the root cryptographic node encryption key in a metadata node of the data file.

3. The system of claim 2, wherein
    if the selected ancestor cryptographic node is the root cryptographic node, the instructions further cause the computer to:
    save the encrypted data node of the data file to the data storage; and
    save each ancestor encrypted cryptographic node associated with the encrypted data node to the data storage.

4. The system of claim 3, wherein the instructions further cause the computer to:
    generate a metadata encryption key for the data file; and
    update the metadata node of the data file.

5. The system of claim 4 wherein
    the metadata node comprises:
        an encrypted portion comprising:
            the root node encryption key; and
            a root integrity check value for the root node encryption key; and
        an unencrypted portion comprising:
            a key identifier; and
            a metadata integrity check value; and
    the instructions to update the metadata node further cause the computer to:
        create the key identifier;
        generate the metadata encryption key using the key identifier;
        generate the metadata integrity check value for the metadata encryption key;
        encrypt the encrypted portion of the metadata node with the metadata encryption key; and
        save the key identifier and the metadata integrity check value in the unencrypted portion of the metadata node.

6. The system of claim 5, wherein
    the operation of writing data to the selected node among the data nodes comprises saving the data in the selected data node.

7. The system of claim 6, wherein
    the instructions to generate the root cryptographic node encryption key further cause the computer to generate the root cryptographic node encryption key from a sealing key of a secure enclave comprising the instructions.

8. A method comprising:
    when processing a data file that comprises data nodes and cryptographic nodes that are to be encrypted before being stored to data storage, write data to a selected node among the data nodes;
    generating a node encryption key for the selected node;
    encrypting the selected node with the node encryption key;
    saving the node encryption key and a node integrity check value for the node encryption key in a parent cryptographic node;
    selecting an ancestor encrypted cryptographic node as a next selected node; and
    repeating the generating, encrypting, saving, and selecting the ancestor cryptographic node operations until the selected ancestor cryptographic node is a root cryptographic node for the data file.

9. The method of claim 8, wherein
    if the selected ancestor cryptographic node is the root cryptographic node:

the operation of generating the node encryption key comprises generating a root node encryption key for the root cryptographic node; and the operation of saving the node encryption key comprises saving the root node encryption key in a metadata node of the data file.

10. The method of claim 9, wherein
if the selected ancestor cryptographic node is the root cryptographic node, the method further comprises:
saving the encrypted data node of the data file to the data storage; and
saving each ancestor encrypted cryptographic node associated with the encrypted data node to the data storage.

11. The method of claim 10, further comprising:
generating a metadata encryption key for the data file; and
updating the metadata node of the data file.

12. The method of claim 11 wherein
the metadata node comprises:
an encrypted portion comprising:
the root node encryption key; and
a root integrity check value for the root node encryption key; and
an unencrypted portion comprising:
a key identifier; and
a metadata integrity check value; and
the operation of updating the metadata node further comprises:
creating the key identifier;
generating a metadata encryption key using the key identifier;
generating the metadata integrity check value for the metadata encryption key;
encrypting the encrypted portion of the metadata node with the metadata encryption key; and
saving the key identifier and the metadata integrity check value in the unencrypted portion of the metadata node.

13. The method of claim 12, wherein
the operation of writing data to the selected node among the data nodes comprises saving the data in the selected data node.

14. The method of claim 13, wherein
the operation of generating the root cryptographic node encryption key further comprises generating the root cryptographic node encryption key from a sealing key of a secure enclave comprising the instructions.

15. At least one non-transitory computer-readable medium comprising instructions that, when executed by a processor, cause a computer to:
when processing a data file that comprises data nodes and cryptographic nodes that are to be encrypted before being stored to data storage, write data to a selected node among the data nodes;
generate a node encryption key for the selected node;
encrypt the selected node with the node encryption key;
save the node encryption key and a node integrity check value for the node encryption key in a parent cryptographic node;
select an ancestor cryptographic node as a next selected node; and repeat the generating, encrypting, saving, and selecting the ancestor encrypted cryptographic node operations until the selected ancestor cryptographic node is a root cryptographic node for the data file.

16. The at least one computer-readable medium of claim 15, wherein
if the selected ancestor cryptographic node is the root cryptographic node, the instructions cause the computer to:
generate a root cryptographic node encryption key for the root cryptographic node; and
save the root cryptographic node encryption key in a metadata node of the data file.

17. The at least one computer-readable medium of claim 16, wherein
if the selected ancestor cryptographic node is the root cryptographic node, the instructions further cause the computer to:
save the encrypted data node of the data file to the data storage; and
save each ancestor cryptographic node associated with the encrypted data node to the data storage.

18. The at least one computer-readable medium of claim 17, wherein the instructions further cause the computer to:
generate a metadata encryption key for the data file; and
update the metadata node of the data file.

19. The at least one computer-readable medium of claim 18, wherein
the metadata node comprises:
an encrypted portion comprising:
the root node encryption key; and
a root integrity check value for the root node encryption key; and
an unencrypted portion comprising:
a key identifier; and
a metadata integrity check value; and
the instructions to update the metadata node further cause the computer to:
create the key identifier;
generate the metadata encryption key using the key identifier;
generate the metadata integrity check value for the metadata encryption key;
encrypt the encrypted portion of the metadata node with the metadata encryption key; and
save the key identifier and the metadata integrity check value in the unencrypted portion of the metadata node.

20. The at least one computer-readable medium of claim 19, wherein
the operation of writing data to the selected node among the data nodes comprises saving the data in the selected data node.

21. The at least one computer-readable medium of claim 20, wherein
the instructions to generate the root cryptographic node encryption key further cause the computer to generate the root cryptographic node encryption key from a sealing key of a secure enclave comprising the instructions.

* * * * *